July 14, 1959 G. H. NEWCOMER ET AL 2,894,462
LONGITUDINALLY SHIFTABLE BULKHEADS FOR FREIGHT CARS
Filed Aug. 18, 1955 4 Sheets-Sheet 1
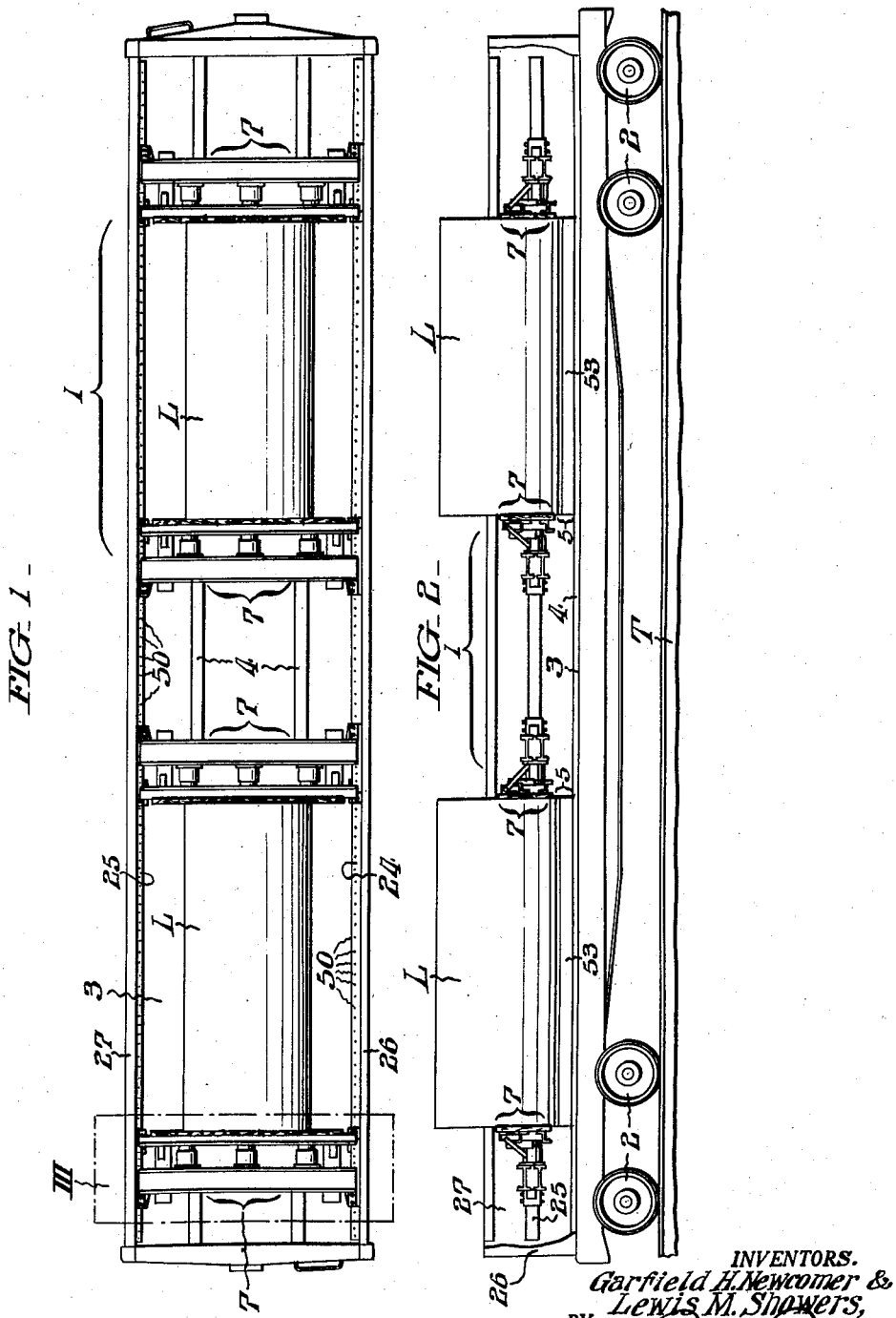
INVENTORS.
Garfield H. Newcomer &
Lewis M. Showers,
BY
ATTORNEYS.

July 14, 1959 G. H. NEWCOMER ET AL 2,894,462
LONGITUDINALLY SHIFTABLE BULKHEADS FOR FREIGHT CARS
Filed Aug. 18, 1955 4 Sheets-Sheet 2
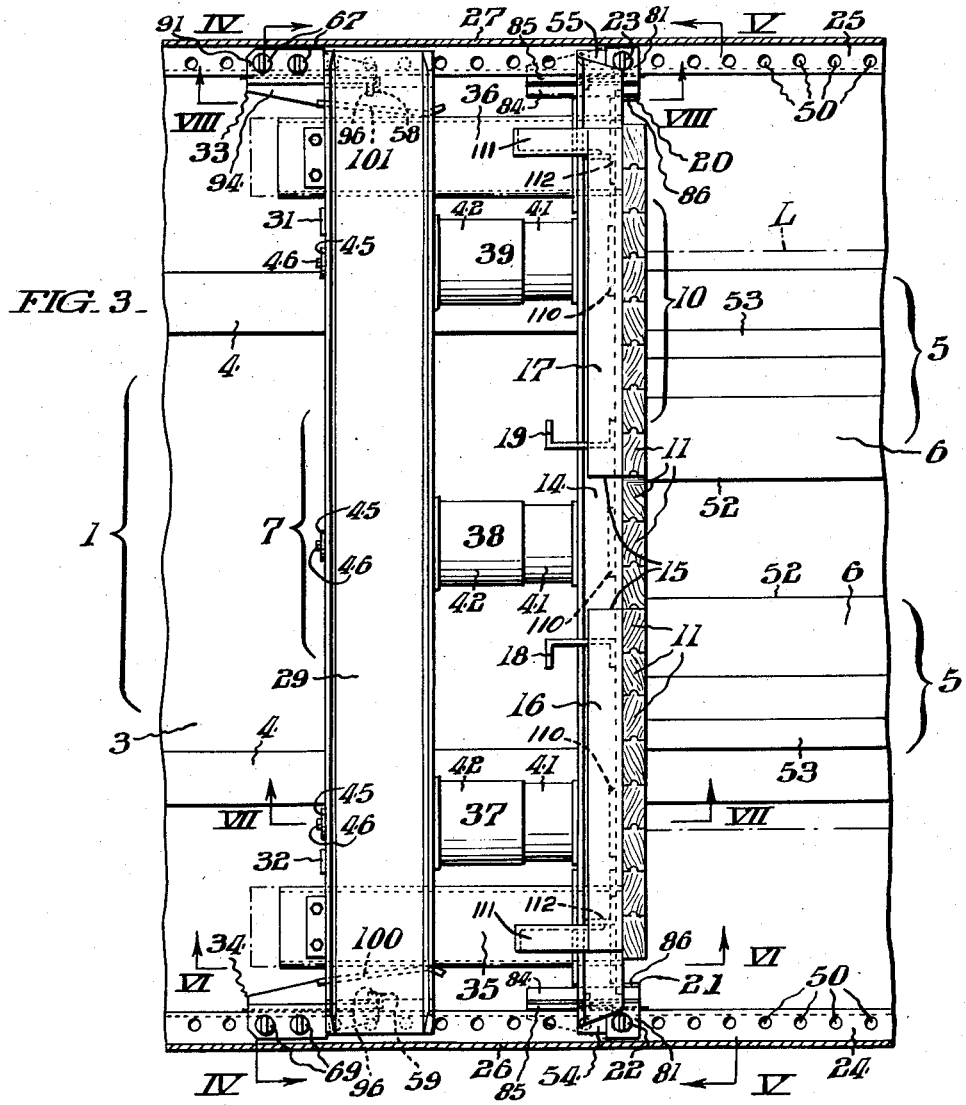
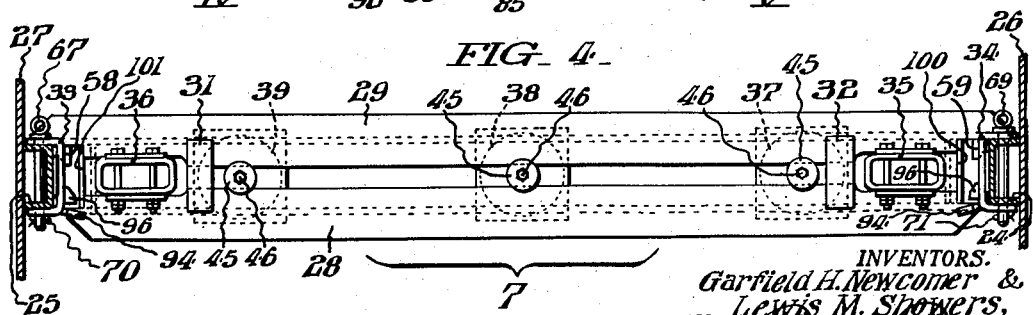
INVENTORS.
Garfield H. Newcomer &
Lewis M. Showers,
BY
ATTORNEYS.

July 14, 1959 G. H. NEWCOMER ET AL 2,894,462
LONGITUDINALLY SHIFTABLE BULKHEADS FOR FREIGHT CARS
Filed Aug. 18, 1955 4 Sheets-Sheet 3
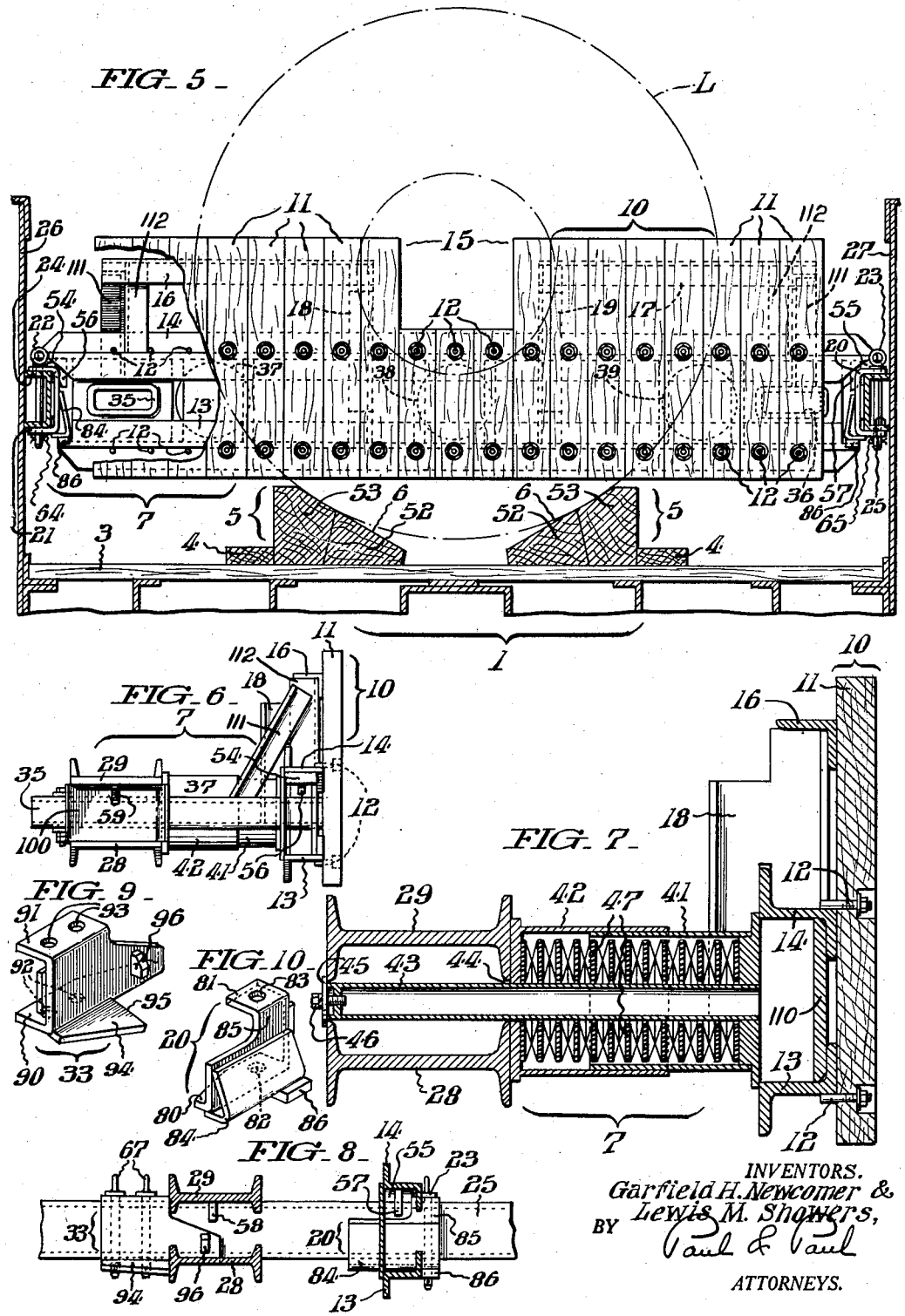
INVENTORS.
Garfield H. Newcomer &
Lewis M. Showers,
BY
Paul & Paul
ATTORNEYS.

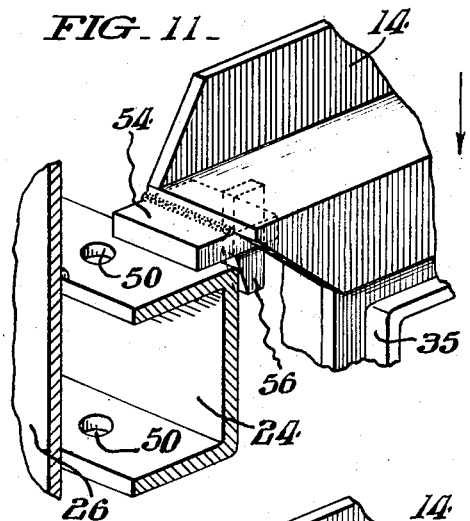
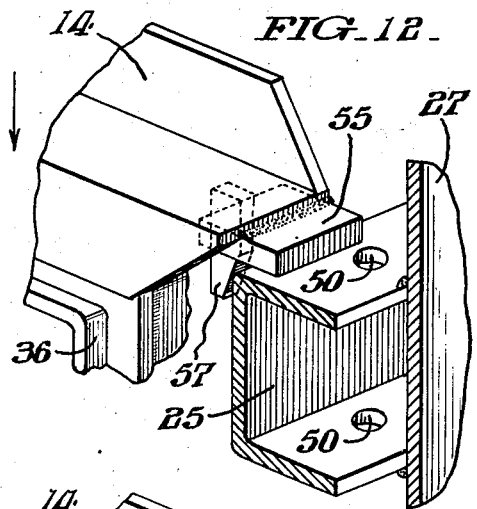
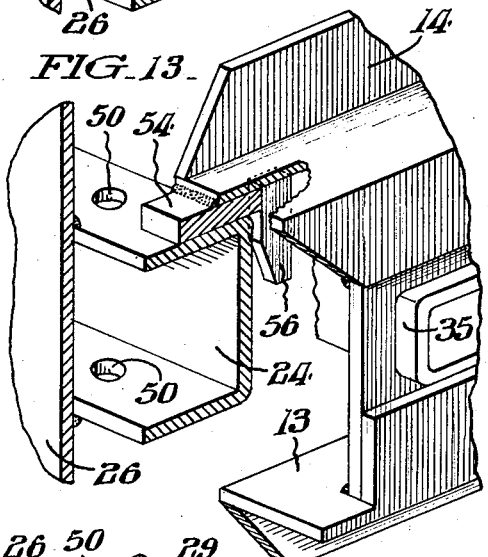
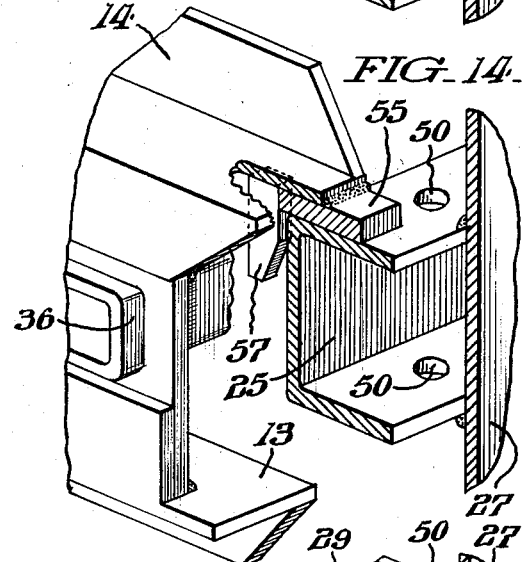
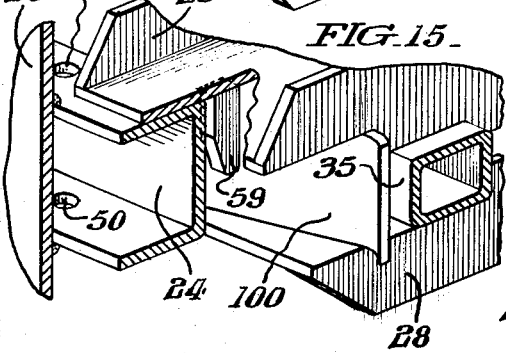
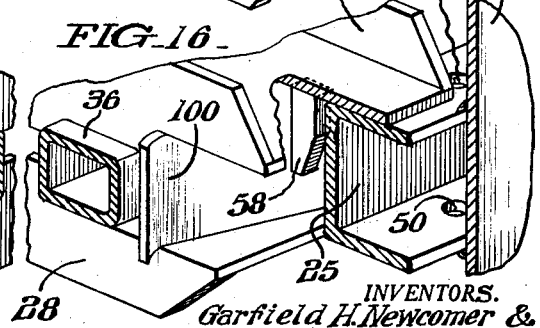

United States Patent Office 2,894,462
Patented July 14, 1959

2,894,462

LONGITUDINALLY SHIFTABLE BULKHEADS FOR FREIGHT CARS

Garfield H. Newcomer, Clifton Heights, and Lewis M. Showers, Lansdowne, Pa., assignors to The Pennsylvania Railroad Company, Philadelphia, Pa., a corporation of Pennsylvania Application August 18, 1955, Serial No. 529,206

3 Claims. (Cl. 105—369)

This invention relates to apparatus for retaining heavy freight loads in place in open or gondola type freight cars. Of particular concern are loads of materials, such as steel, having high specific weight which would ordinarily slide about the freight car causing great damage. For example, a coil of sheet steel would roll freely if placed on its side, and by virtue of the relative smoothness of steel, woul tend to slide in the freight car unless fixed in position. It has been known in the art to place the steel coils on raised skids which prevent rolling and to block in or strap down the coils to prevent sliding on the skids. However, it has been found that when the load is rigidly tied down, the normal forces engendered by the starting and stopping of the freight car and arising from vibration during travel in many cases wear down and destroy the retaining means. This is especially true with respect to structures devised to prevent longitudinal shifting of the load.

It is a primary object of this invention to provide means for retaining heavy loads in an open freight car against longitudinal shifting, which means absorbs the forces resulting from shifts in the load during starting and stopping and from vibration of the load during travel.

It is also an object of this invention to provide load blocking means for a railroad freight car which may be easily moved and removed from the car.

In accordance with these and other necessarily related objects, the invention provides a load blocking device for a railroad freight car which may be rigidly but moveably attached to the sides of car, which is adapted to be placed against the longitudinal ends of the load and which is capable of resiliently absorbing longitudinal forces occasioned by starting and stopping of the freight car and by vibration during travel.

In fulfilling the principal objects of the invention, many additional and novel advantages are provided which will be apparent from the following description and drawings.

Fig. 1 is a plan view of a gondola type railroad freight car carrying a load of two coils of sheet steel blocked in place by bulkheads made in accordance with the invention.

Fig. 2 is a side elevation partially cut away of Fig. 1.

Fig. 3 is an enlarged view of the area designated III in Fig. 1.

Fig. 4 is a view along the line IV—IV of Fig. 3.

Fig. 5 is a view along the line V—V of Fig. 3.

Fig. 6 is a view along the line VI—VI of Fig. 3.

Fig. 7 is a view along the line VII—VII of Fig. 3.

Fig. 8 is a view along the line VIII—VIII of Fig. 3.

Fig. 9 is a perspective view of a supporting bracket adapted to engage either end of the portion of the bulkhead which is spaced away from the load, made in accordance with the invention.

Fig. 10 is a perspective view of a bracket adapted to engage either end of the portion of the bulkhead which is adjacent to the load, in accordance with the invention.

Fig. 11 is a detailed perspective view partially cut away showing the connection between the forward portions of the bulkhead made according to the invention and the side supporting members affixed to the gondola car with an arrow indicating the direction in which the bulkhead is placed on the gondola.

Fig. 12 is a detailed perspective view partially broken away showing the connection between the bulkhead and the side support affixed to the gondola car of the opposite end of the bulkhead from that shown in Fig. 11.

Fig. 13 is a detailed perspective view similar to Fig. 11 showing different parts broken away.

Fig. 14 is a detailed perspective view similar to Fig. 12 showing different parts broken away.

Fig. 15 is a detailed perspective view partially broken away showing the connection between the rear portion of the bulkhead made according to the invention and the side supports affixed to a gondola car.

Fig. 16 is a view similar to that of Fig. 15 of the opposite end of the rear portion of the bulkhead.

For descriptive purposes throughout, those portions of the bulkhead adjacent the load will be designated "front" or "forward"; those portions remote from the load will be designated "back" or "rear."

Figs. 1 and 2 of the drawings show a gondola car 1 having wheels 2 for movement along a track T. The floor 3 of gondola car 1 is provided with a pair of runners 4 which are disposed on the floor 3. Located between the runners 4 are pairs of supporting blocks comprehensively designated 5. As indicated in Fig. 5, the inner blocks are designated 52 and the outer blocks 53. They have downwardly, inwardly inclined upper surfaces 6 forming a cradle for a cylindrical or other load L. Longitudinally shiftable load blocking means 7 are provided for contacting the ends of the load L to limit the longitudinal movement of the load relative to the gondola car 1.

As shown in Figs. 3 and 5, at the front part of the bulkhead is a wooden panel bumper 10 consisting of a series of relatively thick boards 11 bolted side to side. It has been found most satisfactory to employ wood adjacent the load, since wood is better able to absorb minor movement of the load without damage to the load materials. The bolts 12 are headless bolts welded to Z-beams 13 and 14 with their threaded ends extending through bumper 10. In order to avoid damage to the load, the nuts on bolts 12 are counter-sunk in the bumper 10.

The boards 11 of the bumper 10 are bolted to the forward frame of the bulkhead, which consists of the Z-beams 13 and 14. The upper portion of the forward frame is cut away at 15 to provide working space for crane hooks or other devices for moving the load. This upper portion includes angle iron cross beams 16 and 17 connected to Z-beam 14 by channel beams 18 and 19.

The forward portion of the bulkhead is suspended at either end from channel irons 24 and 25. The brackets 20 and 21 shown in Fig. 10 are affixed by means of pins 22 and 23 to channel irons 24 and 25 which are welded to the sides 26 and 27 respectively, of the freight car.

The rear portion of the bulkhead consists of I-beams 28 and 29 which are disposed horizontally across the freight car parallel to the forward portion of the load block apparatus and which are rigidly connected by the flat plates 31 and 32. The rear portion of the bulkhead is suspended from chanmnel beams 24 and 25 respectively.

The front and rear portions of the bulkhead are slidably connected by the guide members 35 and 36 and the shock absorbers 37, 38 and 39. The guide members 35 and 36 are rigidly connected to the front portion as shown in Fig. 6 and are slidably mounted in the rear portion between the I-beams 28 and 29, as shown in Fig. 4. Vertical reinforcing members 112 are welded to crossbeams 16 and 17. Slanted supporting members 111 are welded at their upper ends to vertical supporting members 112 and at their lower ends to guide members 35 and 36, respectively.

The shock absorbers 37, 38 and 39, shown in Fig. 7, include a front cylindrical portion 41 rigidly connected to the Z-beams 13 and 14, which is slidably inserted in the rear cylindrical portion 42 which is in turn rigidly fixed to the I-beams 28 and 29. The guide tube 43 is rigidly attached to the base of the forward cylinder 41 and extends through the opening 44 in the rear cylinder 42, between the I-beams 28 and 29 and is capped at the rear end by the washer 45 and the bolt 46. In the interior space formed by the cylinders 41 and 42 is the spring 47. While any highly compressible spring-like material could of course be used, depending upon the load, it has been found that rubber is quite satisfactory.

In adapting a freight car for bulkheads made in accordance with the invention, a pair of channel beams 24 and 25 are fixed to the inner sides 26 and 27 of the freight car about halfway from the floor of the car. These channel beams are rigidly attached to the car and extend substantially the entire length thereof as shown in Fig. 1. Each of the channel beams is provided with a series of spaced holes 50, as shown in Figs. 1 and 3.

In operation, the load, such as a coil of sheet steel L as shown in Fig. 5, is placed on wooden blocks 52 and 53 on the floor of the car. These blocks may be fixed to the floor of the car or slidable with respect thereto. A pair of bulkheads 7, as shown in Figs. 1 and 2, are brought up against each end of the coil L with the wooden bumpers 10 adjacent the load. The ends of the upper Z-beam 14 of the forward portions are provided with bearing lugs 54 and 55 which rest on the channel beams 24 and 25. Additional guide lugs 56 and 57 rigidly attached to Z-beam 14 are also provided to position the forward portion between the channel beams 24 and 25. The upper beams 29 of the rear portions of the bulkheads also rest on the channel beams 24 and 25. The lower vertical flanges of the upper channel beam 29 are cut away to enable it to rest on the upper legs of the channel beams 24 and 25. Guide lugs 58 and 59 depend from upper I-beam 29 to position the rear portion between the channel beams 24 and 25. A pair of brackets 20 and 21, one of which is shown in Fig. 10, are then positioned on the channel beams 24 and 25 in front of and adjacent to the top forward beam 14. The brackets 20 and 21 are then locked in place by the latch pins 22 and 23 and the cotter pins 64 and 65. The brackets 20 and 21 prevent forward motion of the front portion load block. The brackets 33 and 34, one of which is shown in Fig. 9, are likewise positioned on the channel beams 24 and 25 behind and adjacent the upper I-beam 29, thereby preventing rearward travel of the rear portion of the bulkhead. The brackets 33 and 34 are held in place on the channel beams 24 and 25 by means of the latch pins 67 and 69 and the cotter pins 70 and 71.

With the coil of sheet steel L thus held in place, any longitudinal shifting of the load will be transmitted through the bumpers 10 and the forward portions of the bulkheads and would be absorbed by the springs 47 in the pistons 37, 38 and 39.

The brackets 20 and 21 one of which is shown in Fig. 10 includes bottom and top flanges 80 and 81 respectively, having aligned openings 82 and 83 therethrough to accommodate the latch pins 22 and 23 which secure the brackets 20 and 21 to the channel beams 24 and 25. The upper flange 81 is cut away and forms the horizontal stop against which the upper Z-beam is positioned. An extended angle 84 is rigidly fixed to the vertical side 85 of the bracket to which a block 86 is fixed; this block forms a stop against the ends of the lower Z-beam 13 preventing transverse motion thereof. It will thus be seen that the forward portion of the bulkhead by means of the brackets 20 and 21 is locked firmly but resiliently in place on the channel beams 24 and 25 and is free to move in only one direction, rearward against the springs 47.

The brackets 33 and 34, one of which is shown in Fig. 9, are designed to retain the rear portion of the bulkhead against rearward travel. The bracket 33 comprises a pair of flanges 90 and 91 each having a pair of aligned openings 92 and 93 adapted to hold the pins 67 and 69 which retain the brackets 33 and 34 in place on the channel beams 24 and 25. The use of two pins on the rear portion is desirable since the greatest stress will be rearward when the bulkhead is in operation. An additional flange 94 extending slightly downward is disposed against the lower rear I-beam 28 and serves to stop rearward motion thereof against the side 95. The lug 96 projecting from the brackets 33 and 34 prevent vertical motion of the rear portion of the bulkhead. The curved plates 100 and 101 are affixed to the horizontal portion of the upper and lower I-beams 28 and 29 and extend forward against the guide members 35 and 36, providing a modified guide and braking effect during operation when the forward portion of the bulkhead moves rearward and also retaining the guide members 35 and 36 in line.

By means of the invention, it will be apparent that it is possible to place a given load completely in compression loading by forcing the rear portions of the bulkheads at either end of the load toward each other sufficiently to compress the springs 47. Under normal operation the beam 13 will not be permitted to travel the complete forward distance to the flange 81 of the brackets 20 and 21 so that the bumpers will also be in continuous contact with the load. This continuous flexible load blocking is not possible with any load block apparatus heretofore known.

It will be appreciated that many variations may be made in various aspects of the invention without departing from the spirit thereof or the scope of the following claims.

Having thus described our invention, we claim:

1. In load blocking apparatus, a railroad freight car having longitudinal sides, bulkhead supporting means mounted substantially horizontally on the longitudinal sides of said car, a bulkhead movably mounted on said supporting means, said bulkhead having a front frame section and a rear frame section and shock-absorbing means operatively connected to and separating said sections, bracket means separate from said bulkhead and slidably attached to said supporting means in front of said front frame section and to the rear of said rear frame section for retaining the bulkhead supported thereon in a substantially fixed position and removable latch means attached to said bracket means and said supporting means for retaining said bracket means in a fixed position on said supporting means.

2. In load blocking apparatus, a railroad freight car having four sides and a floor, a load blocking bulkhead longitudinally movable within said freight car, said bulkhead having a front frame section and a rear frame section and shock-absorbing means operatively connected to and separating said sections and bracket means for limiting longitudinal movement of said bulkhead in one direction, bulkhead supporting means fixed to opposite sides of said freight car for supporting said bulkhead in said freight car and above the floor thereof, said bracket means being disposed on said supporting means adjacent said bulkhead and comprising substantially parallel spaced flanges for mounting said bracket means on said supporting means, said supporting means including means engaging at least one of said flanges for preventing vertical movement between said bracket means and said supporting means, aligned openings in said flanges adapted to receive latch means, removable latch means affixing said flanges to said supporting means preventing relative longitudinal movement therebetween, a web connecting said flanges, a retaining portion extending transversely toward said bulkhead from said web adapted to engage said bulkhead to limit the longitudinal movement of said bulkhead along said supporting means and a lug extending transversely toward said bulkhead from said web adapted to engage said bulkhead to limit the vertical movement of said bulkhead in said freight car.

3. In load blocking apparatus, a railroad freight car having opposed sides, spaced parallel bulkhead supporting means affixed longitudinally in said freight car and fixed to opposite sides thereof, a bulkhead mounted on said supporting means having structural frame members transversely spanning said freight car on said supporting means, said bulkhead having front frame section and a rear frame section and shock absorbing means operatively connected to and separating said sections, and bracket means removably affixed to said supporting means separate from said bulkhead for limiting the longitudinal and vertical movement of said bulkhead, said bracket means comprising a pair of substantially parallel spaced flanges having aligned openings therein, a substantially triangular flange extending from said bracket means opposite the lower of said spaced flanges and sloping downwardly, said triangular flange being disposed to limit the longitudinal movement of said structural frame members along said supporting means, a vertical side connecting said spaced flanges and a lug projecting from said vertical side above at least a portion of said structural frame member to limit the vertical movement of said bulkhead in said freight car.

References Cited in the file of this patent

UNITED STATES PATENTS

| | | |
|---|---|---|
| 757,781 | Shea | Apr. 19, 1904 |
| 1,070,114 | Carson | Aug. 12, 1913 |
| 1,085,285 | Monesmith | Jan. 27, 1914 |
| 1,564,488 | Nastri | Dec. 8, 1925 |
| 1,597,091 | McMahan | Aug. 24, 1926 |
| 2,065,649 | Burke | Dec. 29, 1936 |
| 2,166,918 | McMullen et al. | July 18, 1939 |
| 2,194,922 | Walsh | Mar. 26, 1940 |
| 2,262,085 | Allen | Nov. 11, 1941 |
| 2,287,852 | Zyara | June 30, 1942 |
| 2,497,683 | Nampa et al. | Feb. 14, 1950 |
| 2,613,615 | Nampa | Oct. 14, 1952 |
| 2,682,426 | Staffe | June 29, 1954 |
| 2,817,304 | Newcomer et al. | Dec. 24, 1957 |